United States Patent [19]

Fisher et al.

[11] 4,249,260
[45] Feb. 3, 1981

[54] NOISE-REDUCING APPARATUS

[76] Inventors: Charles B. Fisher, 2850 Hill Park Rd., Montreal, Quebec, Canada, H3H 1T1; Sidney T. Fisher, 53 Morrison Ave., Mt. Royal, Quebec, Canada, H3R 1K3

[21] Appl. No.: 928,384

[22] Filed: Jul. 27, 1978

[51] Int. Cl.³ .............................................. H04B 1/12
[52] U.S. Cl. .................................... 455/296; 455/312
[58] Field of Search ............... 325/473, 477, 479, 480, 325/472; 179/15 BC, 15 BW, 15 AN, 1 GS, 1 GB; 455/295, 296, 311, 312; 370/119, 118, 19, 18; 371/72

[56] References Cited

U.S. PATENT DOCUMENTS

| 2,194,292 | 3/1940 | Bligh et al. | 250/20 |
| 2,471,427 | 5/1949 | Grieg | 325/473 |
| 2,780,807 | 2/1957 | Frank | 325/473 |
| 3,611,145 | 10/1971 | O'Connor | 325/473 |
| 4,081,837 | 3/1978 | Tada et al. | 325/477 |
| 4,104,594 | 8/1978 | Cann | 325/477 |
| 4,130,805 | 12/1978 | Mori et al. | 325/473 |

OTHER PUBLICATIONS

"Heart-Sound Discriminator" in *Sourcebook of Electronic Circuits*, New York, 1968, p. 278, R. Weiss.
"Zero-Crossing Detector Provides Fast Sync Pulses" *Electronics*, Apr. 19, 1965, p. 91, Prigozy.
Ferrara, "Delayed Output Pulse Generator" *EEE* 13:10, p. 71.
"Comments on Notice of Proposed Rule Making" released by FCC on 10-19-78, by F. T. Fisher's Sons Ltd.

*Primary Examiner*—Douglas W. Olms

[57] ABSTRACT

This invention provides improvements of noise-reducing apparatus for a signal with superimposed noise. The improvement comprises means for double sampling of a signal with the instants of zero-crossings known or ascertainable at the receiving apparatus and with superimposed noise each sampling carried out at intervals not greater than the Nyquist interval for the signal, to produce two interlaced sequences of samples, reconstructing the signal plus superimposed noise from the first sequence of samples, taken at instants near peaks of the signal, reconstructing the superimposed noise only from the second sequence of samples, taken at instants of zero-crossings of the signal, and subtracting the reconstructed superimposed noise from the reconstructed signal plus superimposed noise, to produce the signal substantially free from the superimposed noise.

1 Claim, 1 Drawing Figure

NOISE-REDUCING APPARATUS

BACKGROUND OF THE INVENTION

This invention provides means for reducing noise, superimposed on a signal with instants of zero-crossings known or ascertainable at the receiving apparatus. We have not found prior patent art relevant to sampling means for reducing noise superimposed on a signal, with instants of zero-crossings known or ascertainable at the receiving apparatus. We do not know of any publication disclosing or any apparatus including such means.

BRIEF DESCRIPTION AND OBJECTS OF THE INVENTION

This invention provides means in a receiving apparatus for reducing noise superimposed on a signal, when the signal without superimposed noise has the interval between any two adjacent zero-crossings not greater than the Nyquist interval for the signal band, and the instants of zero-crossings of the signal without superimposed noise are known at or are ascertainable by the receiving apparatus. The noise-reducing means comprises sampling means which sample the signal plus superimposed noise at intervals not greater than the Nyquist interval for the signal band, at approximate instants of zero-amplitude of the signal, to produce a first sequence of samples, fully defining the noise superimposed on the signal, without any components of the signal. The sampling means also samples the signal at instants lying approximately midway between the instants of samples of the first sequence, with intervals between the adjacent samples of the second sequence not greater than the Nyquist interval for the signal, to produce the second sequence of samples, which fully defines the signal plus the superimposed noise. The first sequence of samples is then subtracted from the second sequence of samples, either before or after reconstruction of the superimposed noise, and the signal plus superimposed noise, by integration of the sequences of samples, to produce the signal substantially free from the superimposed noise.

The object of the invention is to provide a receiving apparatus, which substantially reduces noise superimposed on a signal, when the signal has the instants of zero-crossings known to or ascertainable by the receiving apparatus, and the interval between any two adjacent zero-crossings of the signal, without superimposed noise, is not greater than the Nyquist interval for the signal.

DETAILED DESCRIPTION OF THE INVENTION

Figure 1:
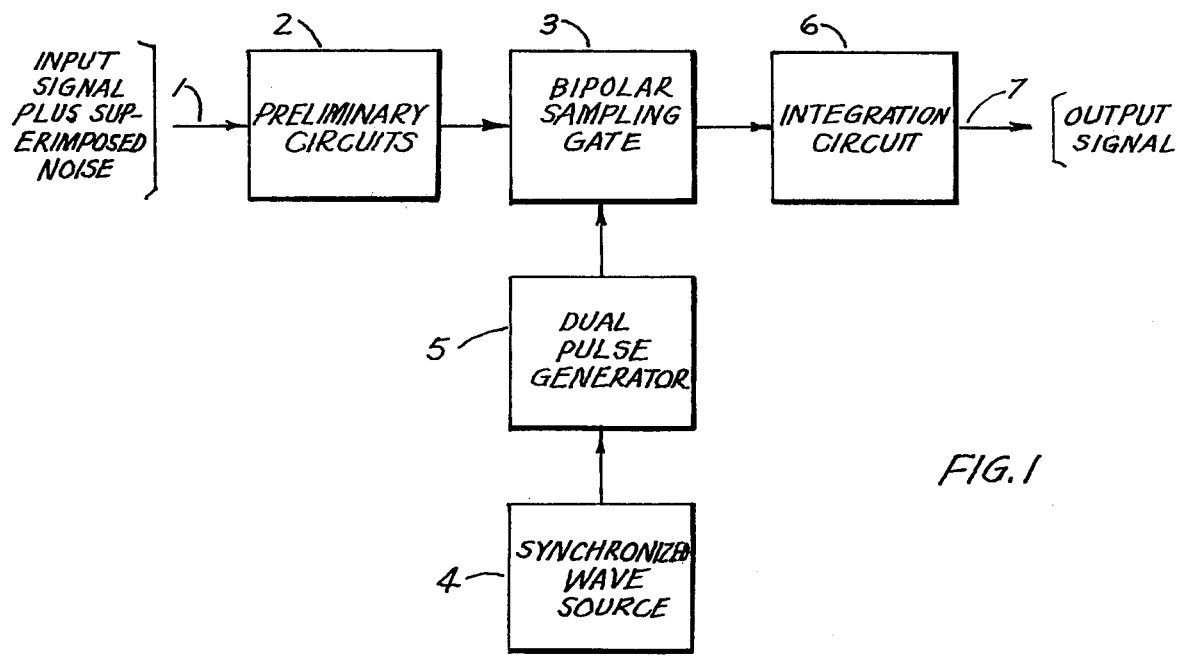
FIG. 1 shows in block-schematic form an embodiment of the invention in a receiving apparatus.

Sampling theory teaches that a signal of a significant bandwidth, $f_2 - f_1$, is fully defined by a sequence of samples taken at intervals of time in the range $\frac{1}{2}(f_2 - f_1)$ to $\frac{1}{4}(f_2 - f_1)$, the exact value, which is known as the Nyquist interval for the signal, depending on $f_2$ and $f_1$. Such a sequence of samples can be reconstructed by integration to produce a replica of the signal. If $f_1 = 0$, a low-pass filter may be used for integration; if $f_1 > 0$, a band-pass filter may be used for integration. The time origin of the samples is unimportant; it is only the intervals between adjacent samples which matters. An exposition of sampling theory is given in "Reference Data for Radio Engineers", New York 1969, at pages 21-14, 38-13 and 38-14.

In this invention, a signal is assumed which has zero-crossings, the instants of which are known or ascertainable at the receiving apparatus, and the interval between any two adjacent zero-crossings is not greater than the Nyquist interval for the signal. It is further assumed that the signal has superimposed noise. This invention relates to any signal which has zero-crossings, the instants of which are known or ascertainable at the receiving apparatus, and in which the interval between any two adjacent zero-crossings is not greater than the Nyquist interval for the signal, when the signal is reduced to its minimum significant components of information.

In this invention the signal with superimposed noise is sampled for periods short relative to the interval between zero-crossings of the signal, at approximate instants of zero-crossings of the signal, at intervals not greater than the Nyquist interval for the signal, to produce a first sequence of samples. This first sequence contains substantially no components of the signal, but fully defines the superimposed noise.

The signal with superimposed noise is sampled a second time to produce a second sequence of samples. The samples of the second sequence have the same period of duration as the samples of the first sequence, and one sample of the second sequence is located between each sample of the first sequence, so that the interval between any two adjacent samples of the second sequence is not greater than the Nyquist interval for the signal. The instants of sampling for the second sequence are chosen to occur approximately at peaks of the signal. Thus the second sequence of samples fully defines the signal plus superimposed noise.

Then by subtraction of the first sample sequence from the second sample sequence, either before or after integration of the sample sequences in a filter or filters, the signal is produced substantially free from noise.

We now consider some types of signals which meet the requirements for reduction of superimposed noise, by the means disclosed in this invention. A carrier, constant in frequency and amplitude, amplitude-modulated on a double-sideband basis, results in a wave which has each zero-crossing at the exact instant of a corresponding zero-crossing of the carrier. For useful ranges of frequencies, the Nyquist interval for the signal is greater than the interval between successive zero-crossings of the carrier. Since the carrier frequency and phase, in the presence of noise superimposed on the signal, can readily be known or ascertained at the receiving apparatus in practical transmission systems, this type of signal is suitable for reduction of superimposed noise by means of this invention. In addition, instants of maximum signal are close to instants of carrier peaks, an advantage in the sampling scheme of this invention.

A carrier with frequency modulation on a double-sideband basis, which is subsequently converted in a discriminator to a carrier which is amplitude-modulated on a double-sideband basis, also meets the requirements of signals for reduction of noise by this invention. The amount of frequency modulation can be ascertained at the receiver, usually by the use of an amplitude limiter, and this information, combined with information derived from the amplitude modulation, enables the receiver to ascertain the instants of zero-crossings of the signal, even in the presence of superimposed noise.

A further example of a signal meeting the requirements for a system utilizing this invention, is a sequence of digital pulses of approximately equal duration, each adjacent pair of which is separated by one or more periods at which the signal returns to zero amplitude, or crosses the zero axis. In such a signal, in general, the Nyquist interval is equal to the spacing of adjacent pulses, and hence the signal plus superimposed noise must be sampled at each point of zero amplitude of the signal without noise, and at one point during each pulse, in order to generate the two sequences of signal samples required to reduce noise, according to this invention. Such a signal is equivalent to a carrier with amplitude modulation.

For each different type of signal, such as are described above, a different embodiment of the invention is in general required. FIG. 1 shows in block-schematic form an embodiment of the invention in a receiving apparatus, which receives a signal comprising a sequence of digital pulses of equal duration, with at least one instant of zero amplitude between every pair of adjacent pulses. The Nyquist interval of this signal, if the sequence is reduced to the signal of smallest bandwidth consistent with transmission of the information contained in the signal, is equal to the pulse duration, where the pulses are all of the same amplitude with equal or opposed polarities, the same duration, and spacing, and are on a basis of return-to-zero (RZ), pulse recording, or return-to-bias (RB). These types of signals are well known in the art, and are shown in "Reference Data for Radio Engineers", New York 1969, at page 32-21.

In FIG. 1 an input digital signal in return-to-zero form, with superimposed noise, is assumed to be present on input lead 1. As is well known, any digital sequence can be converted to this form. The signal is passed through preliminary circuits 2, which may modify the signal in a number of ways, such as amplification, adding or subtracting a d-c component, attenuating frequencies above the maximum frequency of repetition of the pulses, so as to round-off the pulse waveforms, or by other procedures. The signal is then delivered to the input of bipolar sampling gate 3. This designation indicates that when the gate is opened by a pulse of a first polarity it delivers from its output to integration circuit 6 a sample of the input signal with the polarity as received at gate 3. When gate 3 is opened by a pulse of a second polarity it delivers from its output a sample of its input signal, reversed in polarity. Such a gate is a well-known device, and may consist of 4 diodes in a lattice configuration, connected between center-tapped windings of two transformers, with the gating pulses delivered to the center points of the windings.

The gating pulses originate in synchronized wave source 4. This may be a wire or radio link to the timing circuit which times the pulses of the signal as generated. It may also be a high-stability oscillator, which remains accurately in synchronism with the timing apparatus at the signal generating point for long periods of time. It may further be one of a number of well-known circuits using selective means, which ascertains the timing of the signal pulses from the received wave, aided by the fact that the receiving apparatus has knowledge of the frequency of the signal timing circuits.

The output of synchronized wave source 4 drives dual pulse generator 5. This device is an assembly of well-known circuits, connected in a manner obvious to one skilled in the art, so that at the instant of each zero-crossing of the output of synchronized wave source 4, and hence of the timing source for the signal wave, dual pulse generator 5 delivers a pulse of a first polarity to bipolar gate 3, and at approximately one-half the duration of a pulse, following the instant of each of said zero-crossings, dual pulse generator 5 delivers a pulse of a second polarity to bipolar sampling gate 3.

Gate 3 therefore delivers two interlaced sequences of samples, of the input wave plus superimposed noise, to integration circuit 6. The first sequence consists of non-inverted samples of the signal plus superimposed noise, taken at instants of approximately maximum signal amplitude. The first sequence hence fully defines the signal plus superimposed noise. The second sequence of samples, of which each sample lies approximately midway between two successive samples of the first sequence, is comprised of samples of the signal plus superimposed noise, taken at instants at which the signal amplitude is zero. The second sequence of samples therefore fully defines the negative value of the superimposed noise, without signal components. The combined sequence, made up of the first and second sequences of samples of the signal plus superimposed noise, may then be reconstructed in integration circuit 6, and the net result is the signal substantially free from noise, delivered at output lead 7, as the noise waves from each of the sequences of samples are in opposite polarity at the input to integration circuit 6. It may be stressed that the sampling theorem makes no mention of the time origin of the samples. The time of origin is unimportant; it is only the spacing of the samples which matters. In the receiving apparatus there may be differences in amplitude and delay affecting the first and second signals, and these differences must obviously be corrected by suitable equalizers, before one signal is combined with the other.

The phrase zero-crossing as used herein includes both the case in which the amplitude of a wave moves from a material distance on one side of the zero axis to a material distance on the other side of the zero axis, and the case in which the amplitude of the wave moves from one side of the zero axis, touches the zero axis, and returns to the same side of the zero axis.

What we claim is:

1. A receiving apparatus for a signal with zero crossings at instants known to or ascertainable by said receiving apparatus, with superimposed noise, and with the spacing of said zero crossings less than the Nyquist interval for said signal, comprising:

a sampling device which samples said signal plus said superimposed noise, delivering a first sequence of samples of one polarity when driven by positive pulses, and a second sequence of samples of opposed polarity when driven by negative pulses, positive pulses being spaced at intervals not greater than the Nyquist interval for said signal, and a generator of said negative and said positive pulses, producing pulses of each polarity successively, and a source of waves synchronized with said zero crossings of the timing device for said signal, driving said pulse generator, so that said pulses of one polarity occur approximately at said zero crossings of said signal, and said pulses of the opposite polarity occur approximately midway between said zero crossings of said signal, and equalizing means for each of said sample sequences such that gain and delay for each of said sample sequences are substantially equal, and integration means which simultaneously integrates said sample sequences.

* * * * *